United States Patent [19]

Ando et al.

[11] Patent Number: 4,928,730
[45] Date of Patent: May 29, 1990

[54] PROPORTIONAL ELECTROMAGNETIC VALVE HAVING AMPLIFIER THEREIN

[75] Inventors: Tsuyoshi Ando, Sano; Nakayasu Hirono, Yokohama; Hirotoshi Nakao, Sano; Akio Mito, Sano; Kazuyuki Kihara, Sano; Kosuke Hatakenaka, Sano; Hiroshi Ogawa, Sano, all of Japan

[73] Assignee: Tokyo Keiki Company, Ltd., Tokyo, Japan

[21] Appl. No.: 221,416

[22] Filed: Jul. 19, 1988

[30] Foreign Application Priority Data

Jul. 30, 1987 [JP]  Japan .............................. 62-117330[U]
Jul. 30, 1987 [JP]  Japan .............................. 62-117331[U]

[51] Int. Cl.$^5$ ........................................... F15B 13/044
[52] U.S. Cl. ................................ 137/554; 137/625.65; 137/884; 251/129.08; 251/129.1; 251/129.15
[58] Field of Search .................... 137/554, 625.65, 884; 251/129.08, 129.1, 129.15

[56] References Cited

U.S. PATENT DOCUMENTS

| 4,308,891 | 1/1982 | Loup .......................... 137/625.65 X |
| 4,418,720 | 12/1983 | Day et al. ...................... 137/628.65 |
| 4,458,289 | 7/1984 | Lukasczyk ................. 251/129.08 X |
| 4,796,661 | 1/1989 | Hishinuma et al. ........ 251/129.08 X |

FOREIGN PATENT DOCUMENTS

| 57-76376 | 5/1982 | Japan ................................. 251/129.1 |
| 57-76377 | 5/1982 | Japan ................................ 137/625.65 |
| 143284 | 7/1985 | Japan ..................................... 137/884 |
| 126163 | 8/1986 | Japan ..................................... 137/884 |

Primary Examiner—Gerald A. Michalsky
Attorney, Agent, or Firm—Wenderoth, Lind & Ponack

[57] ABSTRACT

A proportional electromagnetic valve includes a valve main body having a valve member, a solenoid to drive the valve member, and an amplifier unit to control the solenoid. The solenoid is attached to one or both side portions of the valve main body. The amplifier unit has a size which is almost equal to a size on the unit attaching surface side of the valve main body and solenoids. The casing of the amplifier unit has an enclosing space large enough such that single printed board having all of drive amplifiers attached there to placed in the casing of the amplifier unit.

20 Claims, 8 Drawing Sheets

PROPORTIONAL ELECTROMAGNETIC VALVE HAVING AMPLIFIER THEREIN

BACKGROUND OF THE INVENTION

The present invention relates to a proportional electromagnetic valve for controlling flow rate, direction, shut-out, pressure, and the like of a fluid by driving solenoids in accordance with an external command signal and, more particularly, to a structure of a proportional electromagnetic valve having therein an amplifier to selectively drive solenoids.

FIG. 1 shows an example of a conventional proportional electromagnetic valve having therein an amplifier with a part cut away. FIG. 2 shows a plane view wherein the lid of an amplifier unit is removed.

In FIG. 1, reference numeral 10 denotes a valve main body; 12-1 and 12-2 indicate solenoids; 14 is an amplifier unit having therein an electric circuit to selectively drive the solenoids 12-1 and 12-2; 16 a casing; 18 a lid of the casing 16; 20-1 and 20-2 are printed circuit boards on which a drive amplifier is attached; 22 a display plate on which volume adjusters and display lamps are arranged; and 24-1 and 24-2 cable lead-in ports.

As shown in FIG. 2, which illustrates the amplifier unit with the lid 18 removed, concave portions 26 are formed at four positions on the side surfaces of the casing 16 of the amplifier unit 14. The concave portions 26 are provided so as to insert bolts from the upper portion of the casing 16 when the valve main body 10 of FIG. 1 is attached to an apparatus to be controlled.

In the conventional proportional electromagnetic valve having therein an amplifier, the solenoids 12-1 and 12-2, which drive valve members provided in the valve main body 10, are attached to both sides of the valve main body 10. The amplifier unit 14 is mounted on the valve main body 10. The valve main body 10 is fixed by bolts to an arbitrary apparatus to be controlled. The bolts extend along the four concave portions 26 formed on the side surfaces of the casing 16 into the valve main body 10.

The electric circuit provided in the amplifier unit 14 selects either one of the solenoids 12-1 and 12-2 in accordance with the controlling direction based on an external DC electric signal. The electric circuit then corrects an activation response characteristic by a ramp circuit or the like and, thereafter, it adjusts a drive current which is sent to the solenoid 12-1 or 12-2. Thus, the opening/closing speeds and opening degrees of the valve members in the valve main body 10 are controlled.

The drive amplifier of the amplifier unit 14 is attached to the printed circuit board and provided in the casing 16.

As shown in FIG. 2, the concave portions 26 are formed at four positions on the side surfaces of the casing 16. The enclosing space in the casing 16 is narrow and the size of the printed circuit board which is assembled in the casing 16 is also small.

Therefore, the printed circuit board is divided into a plurality of printed circuit boards 20-1 and 20-2 (in this example, two boards). These printed circuit boards are assembled as a solid configuration or a multi-stage structure as shown in the diagram and are mutually connected by wires.

Consequently, there are problems in that the wiring connection among the plurality of divided printed circuit boards and the assembly thereof become complicated and, further, since the printed circuit boards are closely arranged, mutual interferences are caused among the circuits.

On the other hand, since the size of the printed circuit board is small, a drive amplifier which can be attached thereon is limited. For example, the drive amplifier is limited to a circuit which operates only by a DC input signal and a drive amplifier which can operate by contact signal inputs cannot be attached. Accordingly, sufficient circuit function cannot be provided and, moreover, another circuit cannot be extended.

Therefore, a type of input signal cannot be selected in accordance with an apparatus to be controlled and the control characteristic cannot be changed in accordance with the controlling direction. As such, there is a problem such that the foregoing conventional system can only be used for a special application.

SUMMARY OF THE INVENTION

It is an object of the present invention to provide a proportional electromagnetic valve having therein an amplifier in which a sufficiently large enclosing space is assured in an amplifier unit and a plurality of input signal types can be processed by a single printed circuit board and, further, a drive amplifier capable of realizing different control characteristics in accordance with the controlling direction which can be assembled in the electromagnetic valve.

Another object of the invention is to provide a proportional electromagnetic valve having therein an amplifier in which in addition to a drive amplifier, connecting terminals of external cables and volume adjuster and display lamp circuits can be attached onto a single printed circuit board.

Still another object of the invention is to provide a proportional electromagnetic valve having therein an amplifier in which there is provided an electric connecting structure which can easily attach and detach an amplifier unit to and from solenoids on the side of a valve main body.

That is, the present invention relates to a proportional electromagnetic valve comprising: a valve main body; solenoids which are attached to both of or either one of the side surfaces of the valve main body; and an amplifier unit which is mounted on the valve body.

The amplifier unit comprises: a frame-shaped casing which opens at the top and bottom portions of the casing; a lid to close the upper opening portion of the casing; and a bottom plate to close the lower opening portion of the casing.

The casing is large enough to cover the amplifier unit attaching surface by the valve main body and solenoids, and has a sufficiently large enclosing space.

Therefore, the printed circuit board which is enclosed in the casing can be set to a long length adapted to reach the valve main body and solenoids, and the printed circuit board of a large size can be assembled in the casing.

Consequently, a drive amplifier having all of the necessary functions can be attached onto a single printed circuit board at a proper integration degree. Both the contact signal input and the DC signal inputs can be received externally as types of signal inputs and either one of the signal inputs can be arbitrarily selected. On the other hand, independent drive amplifiers of two systems can be provided for two solenoids, so that the different control characteristics can be set for every controlling direction. The proportional electromagnetic valve according to the invention can be used for wide applications.

Further, according to the invention, the electric connection between the printed circuit board enclosed in the casing and the solenoids is detachably performed by a first connecting member provided on the printed circuit board and a second connecting member provided on the solenoid side.

Therefore, the valve main body and amplifier unit can be individually manufactured and assembled. For maintenance and inspection, the amplifier unit can be easily detached from the valve main body side and tested. Also, the amplifier unit can be also easily exchanged.

DETAILED DESCRIPTION OF PREFERRED EMBODIMENTS

Figure 1:
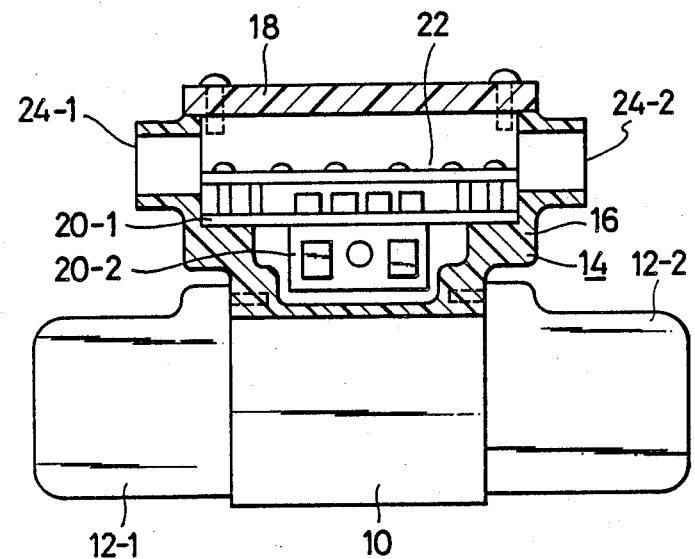
FIG. 1 is a front view with a part cut away showing an example of a conventional proportional electromagnetic valve having an amplifier therein.
Figure 2:
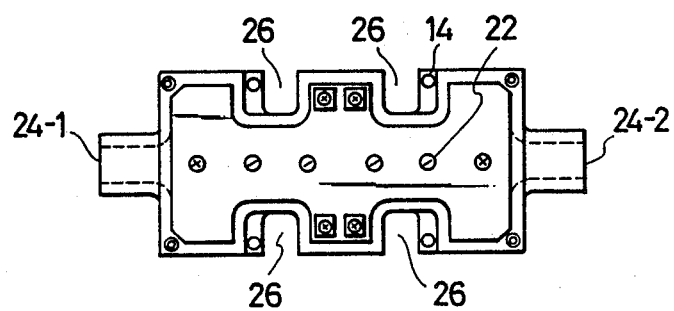
FIG. 2 is a plane view showing the inside of a casing in FIG. 1.
Figure 3:
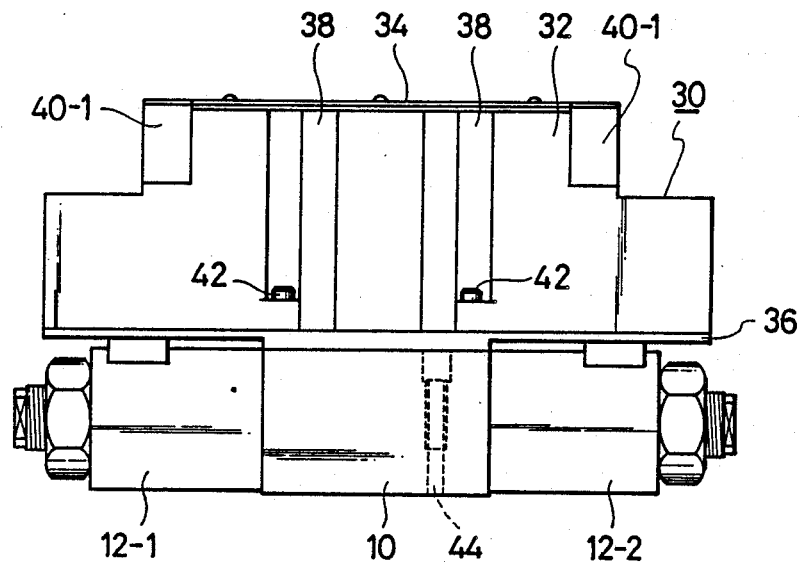
FIG. 3 is a front view showing an embodiment of the present invention.

FIG. 3 is a front view of a proportional electromagnetic valve having an amplifier therein, showing an embodiment of the present invention.

In FIG. 3, the solenoids 12-1 and 12-2 are attached to both sides of the valve main body 10. A spool valve body is provided in the valve main body 10. A driving force is applied to the spool valve body by energizing the solenoid 12-1 or 12-2, so that ports are opened and closed and switched by the spool valve. The internal structure of the valve main body 10 and the solenoids 12-1 and 12-2 are well known in the art.

An amplifier unit 30 is mounted on the valve main body 10 and solenoids 12-1 and 12-2. The amplifier unit 30 comprises: a frame-shaped casing 32 having openings at the top and bottom portions; a lid 34 to close the upper opening portion of the casing 32; and a bottom plate 36 to close the lower opening portion of the casing 32. The casing 32 has a convex shape and cable lead-in ports 40-1 and 40-2 are formed in the stepwise portions of the casing 32. In addition, concave portions 38 are formed at two positions on the side surfaces of the casing 32. The casing 32 is fixed to the valve main body 10 on the bottom sides of the concave portions 38 by screws 42.

Further, through holes 44 are formed in the valve main body 10 at positions which face the concave portions 38 of the casing 32. The proportional electromagnetic valve can be affixed to an apparatus to be controlled by inserting bolts into the through holes 44.

The external size of the amplifier unit 30 consisting of the casing 32, lid 34, and bottom plate 36 is set to a size which is almost equal to the size of the unit attaching surface including the valve main body 10 and solenoids 12-1 and 12-2.

Figure 4:
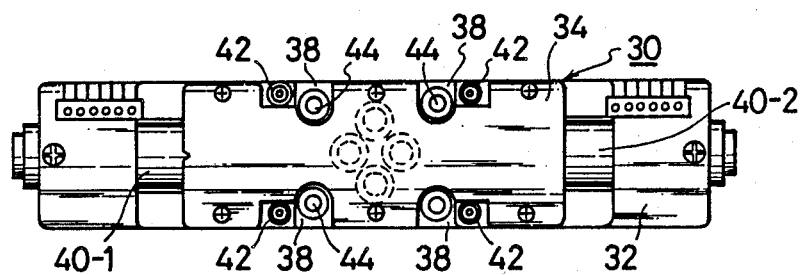
FIG. 4 is a plane view of the embodiment of FIG. 3.

FIG. 4 is a plane view of FIG. 3. The concave portions 38 are formed at two positions on both side surfaces of the casing 32 of the amplifier unit 30. The through holes 44 are formed in the valve main body 10 at the positions which face the concave portions 38. Therefore, bolts can be inserted into the through holes 44 without removing the amplifier unit 30 from the valve main body 10.

Figure 5:
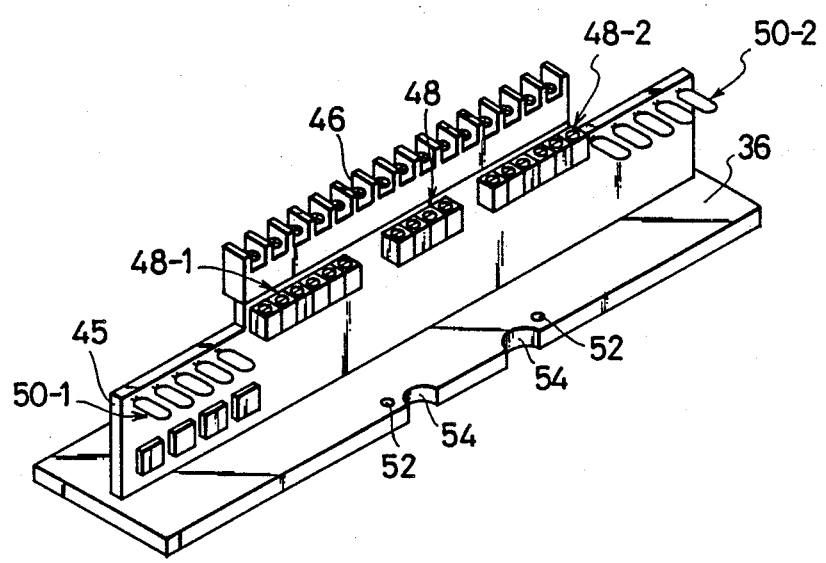
FIG. 5 is a perspective view showing an embodiment of a printed circuit board of the invention.

FIG. 5 shows an embodiment of a printed circuit board which is enclosed in the amplifier unit 30 in FIGS. 3 and 4.

As shown in FIG. 5, a single printed circuit board 45 is assembled in the amplifier unit 30. The printed circuit board 45 is vertically attached to the bottom plate 36. A drive amplifier, which will be clearly described hereinafter, is attached to the printed circuit board 45. As shown in the diagram, a terminal plate 46 for external connecting cables, a plurality of volume adjusting groups 48, 48-1, and 48-2, and a plurality of display lamp groups 50-1 and 50-2 to indicate the operating state of the valve are also attached to the printed circuit board 45.

Further, concave portions 54 which face the concave portions 38 on the side surfaces of the casing 32 shown in FIGS. 3 and 4 are formed on the side surfaces of the bottom plate 36 onto which the printed circuit board 45 is vertically attached. Through holes 52 for the screws 42 to affix the amplifier unit 30 to the valve main body 10 are formed on the outside of the concave portions 38.

Figure 6:
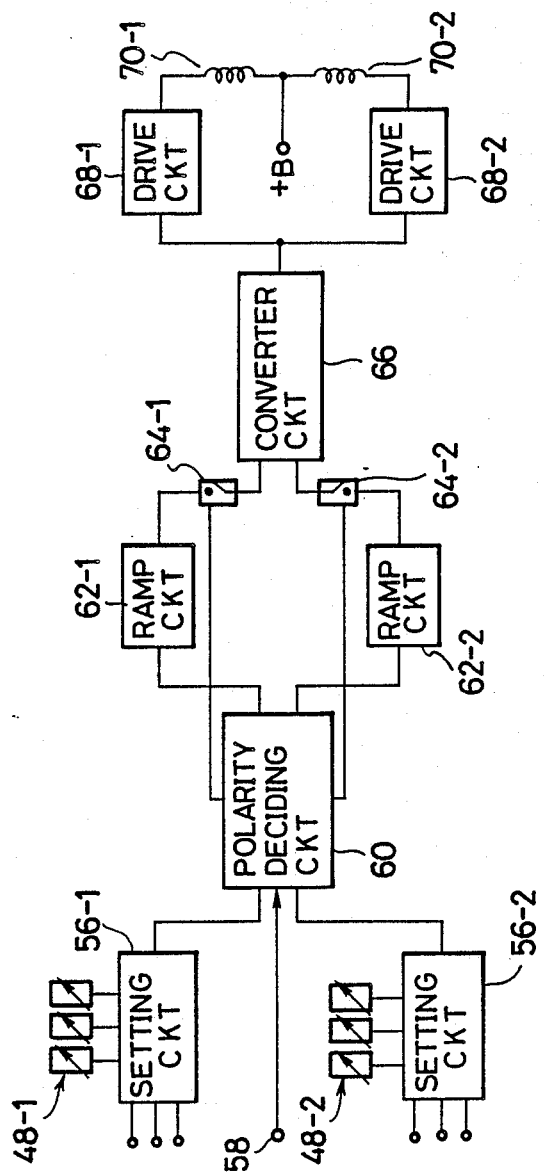
FIG. 6 is a circuit block diagram showing an example of a drive amplifier of the invention.

FIG. 6 shows an example of a drive amplifier which is attached to the printed circuit board 45 of FIG. 5.

In FIG. 6, each of setting circuits 56-1 and 56-2 outputs a positive or negative electric signal set to an externally received predetermined level by a contact input signal. For example, an electric signal of 10 V is output assuming that the volume at the left end in the left upper volume group is set to 10 V, the central volume is set to 5 V, the volume at the right end is set to 2 V, and the volume at the left end, e.g., is selected by the external contact.

Output levels of the setting circuits 56-1 and 56-2 can be adjusted by the volume adjusting groups 48-1 and 48-2.

A DC signal is supplied from an external source to an input terminal 58. The DC input signal of the input terminal 58 is supplied to a polarity deciding circuit 60. The output signals of the setting circuits 56-1 and 56-2 are also input to the polarity deciding circuit 60. The polarity deciding circuit 60 discriminates the polarity of the input signal and outputs a signal indicating the selection either one of the two solenoids. Two outputs of the polarity deciding circuit 60 are respectively supplied to ramp circuits 62-1 and 62-2 and converted into the signals to correct a transient characteristic of an apparatus to be controlled. Outputs of the ramp circuits 62-1 and 62-2 are supplied to a converter 66 through switching circuits 64-1 and 64-2. The converter 66 converts the control signals into a predetermined form on the basis of the voltage-current conversion or the like. An output of the converter 66 is input to drive circuits 68-1 and 68-2, from which drive currents are supplied to solenoid coils 70-1 and 70-2.

As explained above, two systems of the drive amplifiers which are used for the proportional electromagnetic valve having an amplifier therein according to the invention are provided with respect to the two solenoids 12-1 and 12-2 (the solenoid coils 70-1 and 70-2) so that their opening degrees and directions can be individually controlled. On the other hand, either one of the two solenoids 12-1 and 12-2 is selected and the controlling direction can be decided in accordance with the outputs of the setting circuits 56-1 and 56-2 due to the externally received contact input signal and in accordance with the polarity of the DC signal input from the input terminal 58. Further, an opening/closing speed of the valve can be arbitrarily determined by adjusting the level of the input signal.

Moreover, since the setting circuit, ramp circuit, and drive circuit are individually provided for each system of the solenoids 12-1 and 12-2, the control characteristics such as opening/closing speed, opening degree, and the like of the valve in the valve main body 10 can be individually determined in accordance with the controlling direction.

Consequently, the drive amplifier assembled in the amplifier unit 30 can be applied to various types of input signal forms and the control can be individually executed in accordance with the controlling direction, so that multifunctions can be realized and the embodiment can be applied to apparatus to be controlled for various kinds of applications.

Figure 7:
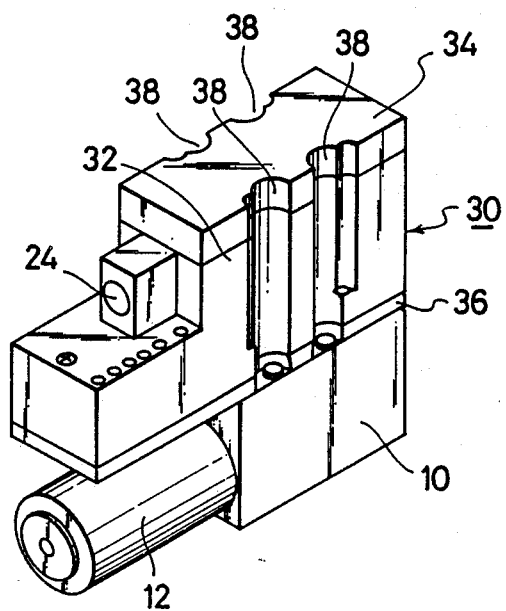
FIG. 7 is a perspective view showing another embodiment of the invention.

FIG. 7 shows another embodiment of the invention wherein one solenoid 12 is attached to the valve main body 10.

In this embodiment of FIG. 7, the amplifier unit 30 also has a size which is almost equal to the size of the unit attaching surface of the valve main body 10 and solenoid 12. A single printed circuit board is assembled in the amplifier unit 30. The entire drive amplifier can be installed onto the single printed circuit board without increasing the integration degree. In addition, the printed circuit board is also vertically attached to the bottom plate 36 in a manner similar to FIG. 5. Further, the drive amplifier of one system shown in FIG. 6 is attached to the printed circuit board.

The printed circuit board 45 is not necessarily enclosed in the casing 32. The surface of the printed circuit board 45 is molded by a synthetic resin or the like and the molded printed circuit board 45 can also be vertically mounted on the bottom plate 36 so as to be exposed.

Figure 8:
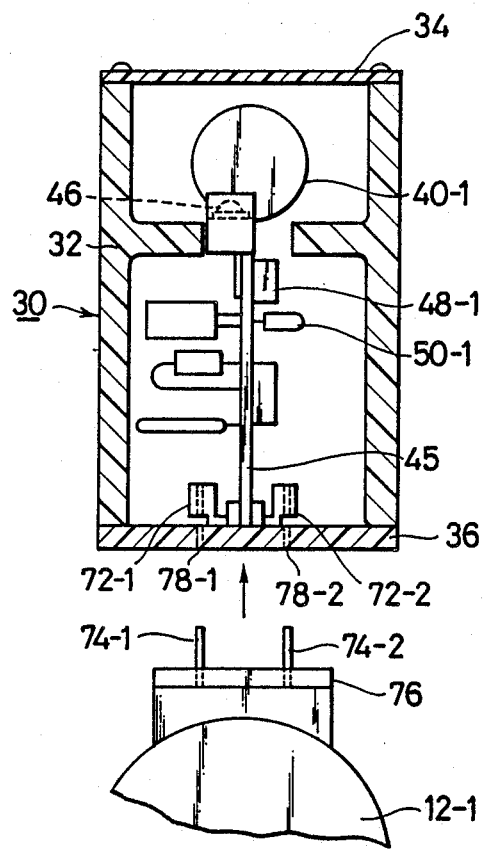
FIG. 8 is a cross sectional explanatory diagram showing an electric connecting structure of an amplifier unit and solenoids.

FIG. 8 shows an embodiment of an electric connecting structure of the amplifier unit and solenoids according to the invention.

As shown in FIG. 8, the printed circuit board 45 is vertically attached to the bottom plate 36 of the amplifier unit 30. The solenoid 12-1 is assembled under the amplifier unit 30 as indicated by the arrow.

A pair of socket members 72-1 and 72-2 serving as first connecting members are affixed to both sides of the printed circuit board 45 attached vertically to the bottom plate 36. The socket members 72-1 and 72-2 can be affixed to the printed circuit board 45 or may be affixed to the bottom plate 36. In the case of affixing the socket members to the bottom plate 36, the printed circuit board 45 is electrically connected to the socket members 72-1 and 72-2 by lead wires. Further, through holes 78-1 and 78-2 are formed in the bottom plate 36 at the positions under the socket members 72-1 and 72-2 attached to the bottom plate 36.

On the other hand, an insulative base plate 76 is attached to the unit attaching surface on the side of the solenoid 12-1. Pins 74-1 and 74-2 serving as second connecting members penetrate the insulative base plate 76 and are upwardly projected therefrom.

Figure 9:
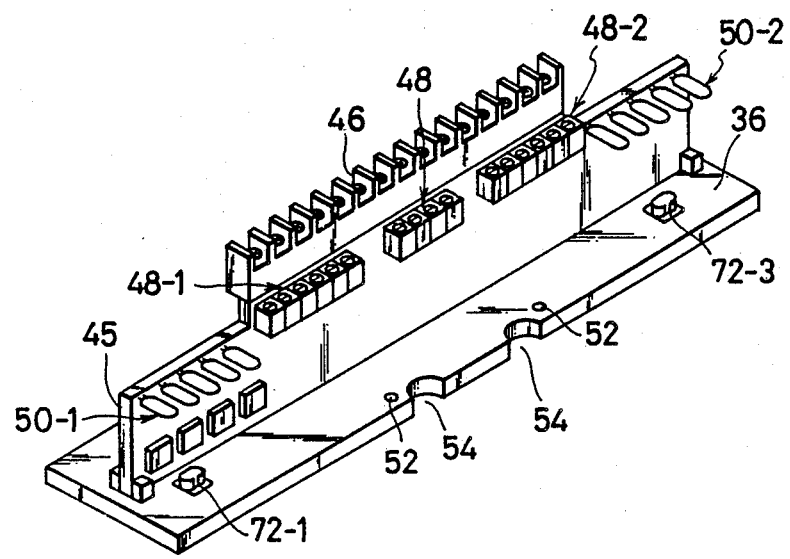
FIG. 9 is a perspective view showing a printed circuit board taken out of FIG. 7.

FIG. 9 shows the printed circuit board 45 of FIG. 8. Socket members 72-1 to 72-4 are attached at four positions of the bottom plate 36 where the solenoids 12-1 and 12-2 are located. However, in this case, the socket members 72-2 and 72-4 cannot be seen because they are located on the back side of the printed circuit board 45.

Therefore, when the amplifier unit 30 is assembled to the valve main body 10, for example, the pins 74-1 and 74-2 provided for the solenoid 12-1 are fitted into the socket members 72-1 and 72-2 in the amplifier unit 30, thereby completing the electric connection.

Figure 10:
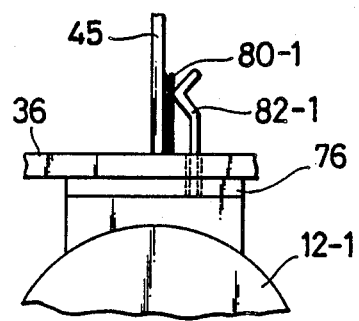
FIG. 10 is an explanatory diagram showing another embodiment of an electric connecting structure of an amplifier unit and solenoids according to the invention.

FIG. 10 shows another embodiment of an electric connection of an amplifier unit and solenoids. In this embodiment, a contact portion 80-1 is formed as a first connecting member to the printed circuit board 45 by plating after etching. On the other hand, on the side of the solenoid 12-1, a contact metal fitting 82-1 made of a spring-like metal material is provided as a second connecting member so as to come into electrical contact with the contact portion 80-1.

Figure 11:
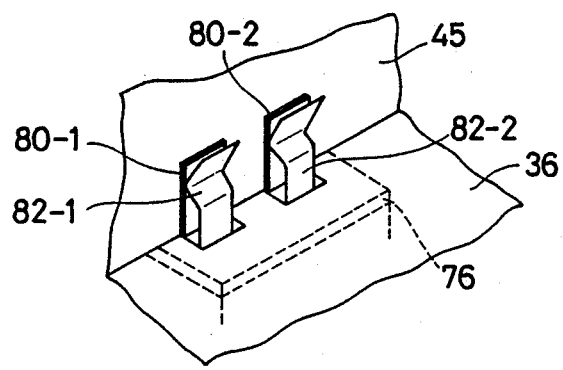
FIG. 11 is a perspective view of the connecting structure of FIG. 10.

FIG. 11 shows a perspective view of FIG. 10. Two similar contact metal fittings 82-1 and 82-2 are projected upward from the solenoid side and come into pressure contact with two similar contact portions 80-1 and 80-2 formed on the printed circuit board 45 of the amplifier unit 30, thereby detachably and electrically connecting the amplifier unit with the solenoids.

Therefore, the electric connection between the amplifier unit 30 and the solenoids 12-1 and 12-2 can be easily realized by merely assembling the amplifier unit 30 to the valve main body 10 having the solenoids 12-1 and 12-2. The valve main body and the amplifier unit can be individually manufactured and assembled and used, so that the producing efficiency is high. In addition, the amplifier unit can be easily exchanged, and the maintenance and inspection of the amplifier unit and electromagnetic valve can be individually executed, so that a high reliability of the proportional electromagnetic valve having an amplifier therein can be assured.

What is claimed is:

1. An electromagnetic valve comprising:
   a valve main body, having opposite side surfaces and a top surface, for controlling at least one of a flow rate, direction, shut off, and pressure of a fluid;
   two solenoids, for controlling said valve main body, each having opposite first and second end portions and each respectively attached at said first end portion to said opposite side portions of said valve main body;
   an amplifier unit having a bottom plate, said bottom plate being attached to said top surface of said valve main body, said amplifier unit further having two opposite end portions extending over said two solenoids, said two opposite end portions of said amplifier unit respectively disposed over said second end portions of said two solenoids;

a printed circuit board disposed in said amplifier unit and having amplifying circuitry for driving said two solenoids, said printed circuit board having opposite end portions respectively disposed over said two solenoids within said amplifier unit;

wherein said printed circuit board if vertically attached to said bottom plate of said amplifier unit, said bottom plate being substantially parallel said top surface of said valve main body.

2. An electromagnetic valve as recited in claim 1, further comprising:

first and second connecting means for respectively electrically connecting said two solenoids to said printed circuit board, each of said first and second connecting means respectively extending directly from said two end portions of said printed circuit board, through said bottom plate, to each of said two solenoids.

3. An electromagnetic valve as recited in claim 2, wherein a lateral width of said bottom plate is substantially the same as a lateral width extending from said second end portion of one of said solenoids to said second end portion of the other said solenoids.

4. An electromagnetic valve as recited in claim 3, wherein said amplifier unit comprises:

a frame-shaped casing having respective openings at top and bottom portions thereof, said amplifier unit being attached to said top surface of said valve main body at said bottom portion of said frame-shaped casing; and, a detachable lid member for opening and closing said opening at said top portion of said casing;

wherein said bottom plate is for opening and closing said opening at said bottom portion at said casing.

5. An electromagnetic valve as recited in claim 3, wherein said printed circuit board further includes a cable connecting terminal plate for connecting external cables and for connecting a plurality of display lamps indicating an operating state of the valve.

6. An electromagnetic valve as recited in claim 2, wherein said amplifier unit comprises:

a frame-shaped casing having respective openings at top and bottom portions thereof, said amplifier unit being attached to said top surface of said valve main body at said bottom portion of said frame-shaped casing; and, a detachable lid member for opening and closing said opening at said top portion of said casing;

wherein said bottom plate is for opening and closing said opening at said bottom portion at said casing.

7. An electromagnetic valve as recited in claim 1, wherein a lateral width of said bottom plate is substantially the same as a lateral width extending from said second end portion of one of said solenoids to said second end portion of the other said solenoids.

8. An electromagnetic valve as recited in claim 7, wherein said amplifier unit comprises:

a frame-shaped casing having respective openings at top and bottom portions thereof, said amplifier unit being attached to said top surface of said valve main body at said bottom portion of said frame-shaped casing; and, a detachable lid member for opening and closing said opening at said top portion of said casing;

wherein said bottom plate is for opening and closing said opening at said bottom portion at said casing.

9. An electromagnetic valve as recited in claim 7, wherein said printed circuit board further includes a cable connecting terminal plate for connecting external cables and for connecting a plurality of display lamps indicating an operating state of the valve.

10. An electromagnetic valve as recited in claim 1, wherein said amplifier unit comprises:

a frame-shaped casing having respective openings at top and bottom portions thereof, said amplifier unit being attached to said top surface of said valve main body at said bottom portion of said frame-shaped casing; and, a detachable lid member for opening and closing said opening at said top portion of said casing;

wherein said bottom plate is for opening and closing said opening at said bottom portion at said casing.

11. An electromagnetic valve comprising:

a valve main body, having opposite side surfaces and a top surface, for controlling at least one of a flow rate, direction, shut off, and pressure of a fluid;

a solenoid for controlling said valve main body, said solenoid having opposite first and second end portions and being attached at said first end portion to one of said opposite side surfaces of said valve main body;

an amplifier unit having a bottom plate, said bottom plate being attached to said top surface of said valve main body, said amplifier unit further having two opposite end portions, one of said two opposite end portions of said amplifier unit being disposed over said second end portion of said solenoid;

a printed circuit board disposed in said amplifier unit and having amplifying circuitry for driving said solenoid, said printed circuit board having opposite end portions, one of said opposite end portions of said printed circuit board being disposed over said solenoid within said amplifier unit;

wherein said printed circuit board is vertically attached to said bottom plate of said amplifier unit, said bottom plate being substantially parallel said top surface of said main valve main body.

12. An electromagnetic valve as recited in claim 11, further comprising:

connecting means for electrically connecting said solenoid to said printed circuit board, said connecting means extending directly from said end portion of said printed circuit board disposed over said solenoid, through said bottom plate, to said solenoid.

13. An electromagnetic valve as recited in claim 12, wherein a lateral width of said bottom plate is substantially the same as a lateral width extending from said second end portion of said solenoid to the other of said opposite side surfaces of said valve main body.

14. An electromagnetic valve as recited in claim 13, wherein said amplifier unit comprises:

a frame-shaped casing having respective openings at top and bottom portions thereof, said amplifier unit being attached to said top surface of said valve main body at said bottom portion of said frame-shaped casing; and, a detachable lid member for opening and closing said opening at said top portion of said casing;

wherein said bottom plate is for opening and closing said opening at said bottom portion at said casing.

15. An electromagnetic valve as recited in claim 13, wherein said printed circuit board further includes a cable connecting terminal plate for connecting external cables and for connecting a plurality of display lamps indicating an operating state of the valve.

16. An electromagnetic valve as recited in claim 12, wherein said amplifier unit comprises:

- a frame-shaped casing having respective openings at top and bottom portions thereof, said amplifier unit being attached at said top surface of said valve main body at said bottom portion of said frame-shaped casing; and,
- a detachable lid member for opening and closing said opening at said top portion of said casing;
- wherein said bottom plate is for opening and closing said opening at said bottom portion at said casing.

17. An electromagnetic valve as recited in claim 11, wherein a lateral width of said bottom plate is substantially the same as a lateral width extending from said second end portion of said solenoid to the other of said opposite side surfaces of said valve main body.

18. An electromagnetic valve as recited in claim 17, wherein said amplifier unit comprises:

- a frame-shaped casing having respective openings at top and bottom portions thereof, said amplifier unit being attached to said top surface of said valve main body at said bottom portion of said frame-shaped casing; and,
- a detachable lid member for opening and closing said opening at said top portion of said casing;
- wherein said bottom plate is for opening and closing said opening at said bottom portion at said casing.

19. An electromagnetic valve as recited in claim 17, wherein said printed circuit board further includes a cable connecting terminal plate for connecting external cables and for connecting a plurality of display lamps indicating an operating state of the valve.

20. An electromagnetic valve as recited in claim 11, wherein said amplifier unit comprises:

- a frame-shaped casing having respective openings at top and bottom portions thereof, said amplifier unit being attached to said top surface of said valve main body at said bottom portion of said frame-shaped casing; and,
- a detachable lid member for opening and closing said opening at said top portion of said casing;
- wherein said bottom plate is for opening and closing said opening at said bottom portion of said casing.

* * * * *